United States Patent [19]
Voss et al.

[11] Patent Number: 5,103,962
[45] Date of Patent: Apr. 14, 1992

[54] DEVICE FOR THE STORING AND DELIVERING OF SMALL ARTICLES

[75] Inventors: Jürgen Voss, Stuttgart; Gerhard Sperr, Waiblingen; Werner Kurz, Esslingen; Odo Hütter, Kirchheim Teck, all of Fed. Rep. of Germany

[73] Assignee: Robert Bosch GmbH, Stuttgart, Fed. Rep. of Germany

[21] Appl. No.: 566,362

[22] PCT Filed: Jan. 11, 1988

[86] PCT No.: PCT/DE89/00011
§ 371 Date: Aug. 13, 1990
§ 102(e) Date: Aug. 13, 1990

[87] PCT Pub. No.: WO89/07567
PCT Pub. Date: Aug. 24, 1989

[30] Foreign Application Priority Data

Feb. 11, 1988 [DE] Fed. Rep. of Germany ....... 3804114

[51] Int. Cl.$^5$ .............................................. B65G 47/12
[52] U.S. Cl. .................... 198/443; 198/391; 198/396; 198/771
[58] Field of Search ............... 198/391, 396, 398, 443, 198/448, 533, 771; 221/159, 160

[56] References Cited
U.S. PATENT DOCUMENTS

| | | | |
|---|---|---|---|
| 3,338,385 | 8/1967 | Sage ................................. | 198/771 |
| 3,841,471 | 10/1974 | Mead ............................... | 198/443 X |
| 4,141,372 | 2/1979 | Gdanski ......................... | 198/771 X |
| 4,282,965 | 8/1981 | Bates et al. ..................... | 198/391 X |
| 4,434,887 | 3/1984 | Yager .............................. | 198/391 |
| 4,457,840 | 7/1984 | Nagl ............................... | 198/771 X |
| 4,844,240 | 7/1989 | Hutter et al. .................... | 198/443 X |

FOREIGN PATENT DOCUMENTS 2802188 7/1979 Fed. Rep. of Germany .
WO87/04688 8/1987 PCT Int'l Appl. .

Primary Examiner—Joseph E. Valenza
Assistant Examiner—Tuan N. Nguyen
Attorney, Agent, or Firm—Michael J. Striker

[57] ABSTRACT

Device for the storage and feed of small parts including a storage container (10, 10a), an ascending conveying track (38) and an oscillating drive (14) for the storage container (10, 10a). The base (24, 24a) of the storage container (10, 10a) is inclined in the oscillating direction and the conveying track (38) extends parallel to the base (24, 24a) and ascends in the oscillating direction in the same direction as the latter. The base (24, 24a) is provided with shoulders (34, 34a) arranged transversely relative to the oscillating direction, which shoulders (34, 34a) ensure that the stored small parts arrive in the input area (32) of the ascending conveying track (38) in an orderly manner.

5 Claims, 3 Drawing Sheets

DEVICE FOR THE STORING AND DELIVERING OF SMALL ARTICLES

BACKGROUND OF THE INVENTION

The invention is based on a device for the storage and feed of small parts including a box-shaped storage container having a base adapted to hold an irregular pile of the small parts. The storage container is also provided with an oscillating drive producing an oscillation of the storage container in an oscillation direction and the base is inclined in the direction of oscillation so that the base has a lowest point. The device also has a conveying track and another conveyor. The conveying track is arranged next to the base of the storage container and ascends from the lowest point of the base in the oscillation direction. The conveying track is likewise driven so as to oscillate and lead into a higher input area of the other conveyor, which is advantageously a linear orientation conveyor. In a this generic type included in the prior art (patent application P 36 02 773.1), the base of the storage container is provided with a smooth and completely planar surface on which the stored small parts slide to the input area of the ascending conveying track. In this construction, the angle of inclination and the surface character of the base of the storage container, as well as its drive, must be carefully adapted to the stored small parts in order to ensure a regular feed of the small parts to the ascending conveying track. It must also be taken into consideration that soiling of the small parts, defective small parts and other foreign influences can impair the reliable operation of the device.

SUMMARY OF THE INVENTION

It is an object of the present invention to provide a device for storing and delivering small parts or articles, which has none of the above-mentioned disadvantages.

According to the present invention at least a partial area of the base of the storage container is provided with shoulders for obstructing and preventing an upward movement of the stored small parts. The shoulders are directed transversely relative to the oscillating direction toward the lowest point of the base.

In the arrangement according to the invention adapting the parameters influencing the operation of the device is less critical than in a construction without obstructing shoulders in the base of the storage container; moreover, its base can also be provided with an angle of inclination which is smaller than in the known construction.

The shoulders at the base of the storage container can be formed by means of step-shaped shoulders or door-sill-like raised portions of the base which can already be formed in during its production without additional work steps. However, the shoulders can also be formed by means of strips or the like which are fastened at the base of the storage container, and their height can be adapted solely to the desired function regardless of the manufacturing requirements.

A simple construction results when the ascending conveying track is mounted directly on the storage container and when the storage container and conveying track have a common oscillating drive. In many cases it can be advantageous if an intermediate wall extending parallel to the oscillating direction is provided between the base of the storage container and the ascending conveying track, which intermediate wall is provide with a through-opening in the area of the lowest point of the base and is preferably also provided in the areas located between the shoulders of the base with through-openings leading into the conveying track.

The conveying track can be connected rigidly or in one piece with the base of the storage container and can possibly pass into the latter at a step. An intermediate wall prevents the small parts from impeding one another in their oppositely directed movement on the base of the storage container and on the conveying track. The height and construction of the intermediate wall can vary corresponding to the geometry of the parts.

A particularly advantageous construction with respect to an unimpaired conveying of the small parts is provided when the shoulders are arranged at the inclined base of the storage container at an angle relative to the oscillating direction in such a way that their lower end portions are adjacent to the conveying track. In this case, the shoulders not only prevent the stored small parts at the container base from wandering upward, but they also exert a force component on the impacting small parts or small parts contacting it, respectively, which force component is directed away from the conveying track. The piles of small parts located on the individual areas of the container base lying between the shoulders are forced away from the conveying track, so that no back-up can form on the latter or on the input area of the latter. The piles of small parts are dismantled in that the small parts of the piles lying on top as remote as possible from the conveying track slide down into the output area of the storage container and arrive in the input area of the conveying track. An intermediate wall between the storage container and the conveying track can be dispensed with by means of this lateral pressing apart of small parts which are conveyed upward and slide or are pushed downward.

If the shoulders at the container base are formed by means of strips placed thereon, the adaptation can also be advantageously effected in such a way that unencumbered small parts or small parts moved back and forth relative to the container base under the influence of the force of gravity and the oscillating drive impact against the higher strip and are thrown against the next lower strip, at which they are guided out into the conveying track. A uniform loading of the conveying track can accordingly also be achieved when the storage container is partially full or is emptying, wherein the individual base areas of the storage container which are separated from one another by the strips are emptied one after the other.

In a further development of the invention it is suggested that the ascending conveying track has, over at least a portion of its width, a cross-sectional profile favoring the entrainment of the small parts. In the case of cylindrical small parts, the ascending conveying track can advisably be provided with a longitudinal channel having a V-shaped cross section or can be constructed as such a channel along its entire width.

In many cases it can also be advantageous if the ascending conveying track is provided with a brush covering which automatically adapts itself approximately to the shape of the small parts. In an advantageous manner, another cross-sectional shape of the part conveying channel can also be provided, which cross-sectional shape is adapted to the shape of the parts. Other coverings with higher friction can also be used.

In storage containers for certain workpieces/classes of workpieces or in storage containers serving as intermediate buffers, the base of the storage container can also function as a deflecting track for small parts which are forced out of the conveying track laterally; these small parts are guided back to the input area of the conveying track on the deflecting track.

When the additional conveyor connected to the ascending conveying track is an orientation conveyor and has a return track for excess and/or non-orientated small parts which is arranged parallel to and running in the opposite direction of the conveying track, the return track of the orientation conveyor can form a circulating storage with the ascending conveyor track, the latter possibly being integrated in the storage container, by means of a corresponding dimensioning of the parts and drives, which circulating track increases the overall storage capacity of the device.

BRIEF DESCRIPTION OF THE DRAWING

Two embodiment examples of the invention are shown in the drawing and explained in more detail in the following description. The following are schematic views.

DESCRIPTION OF THE EMBODIMENT EXAMPLES

Figure 1:
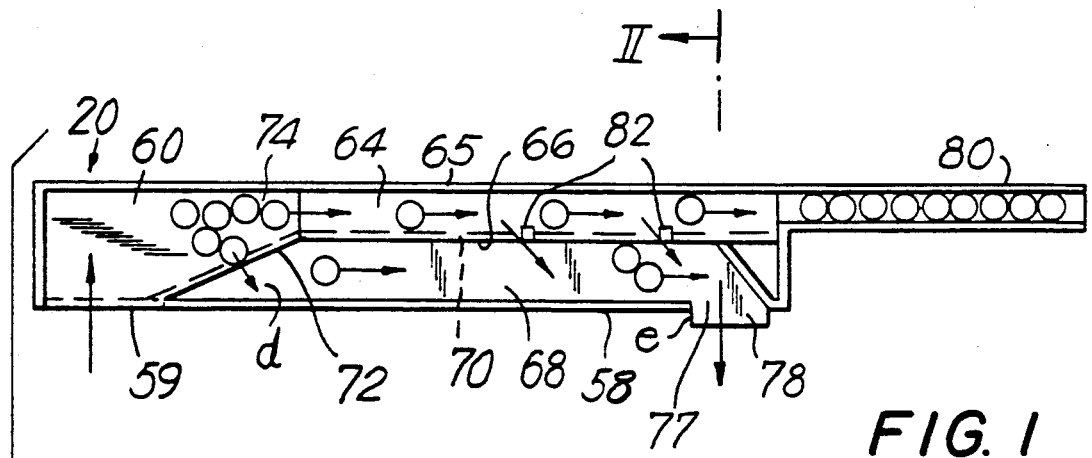
FIG. 1 is a top view of a first embodiment of a device for storing and delivering small articles according to the invention comprising storage container, including ascending conveying track, and an orientation conveyor arranged adjacent to the latter.
Figure 3:
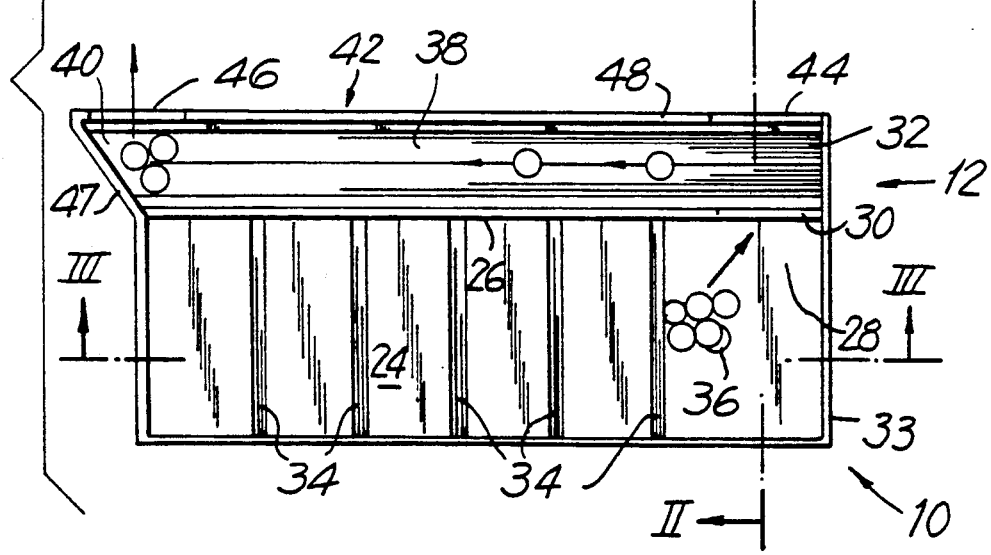
FIG. 3 is a cross sectional view of the device of FIG. 1 according to line III—III in FIG. 1.
Figure 3:
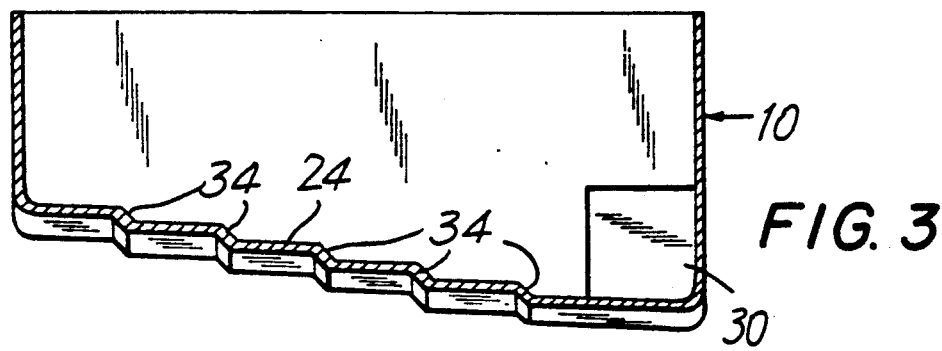
Figure 2:
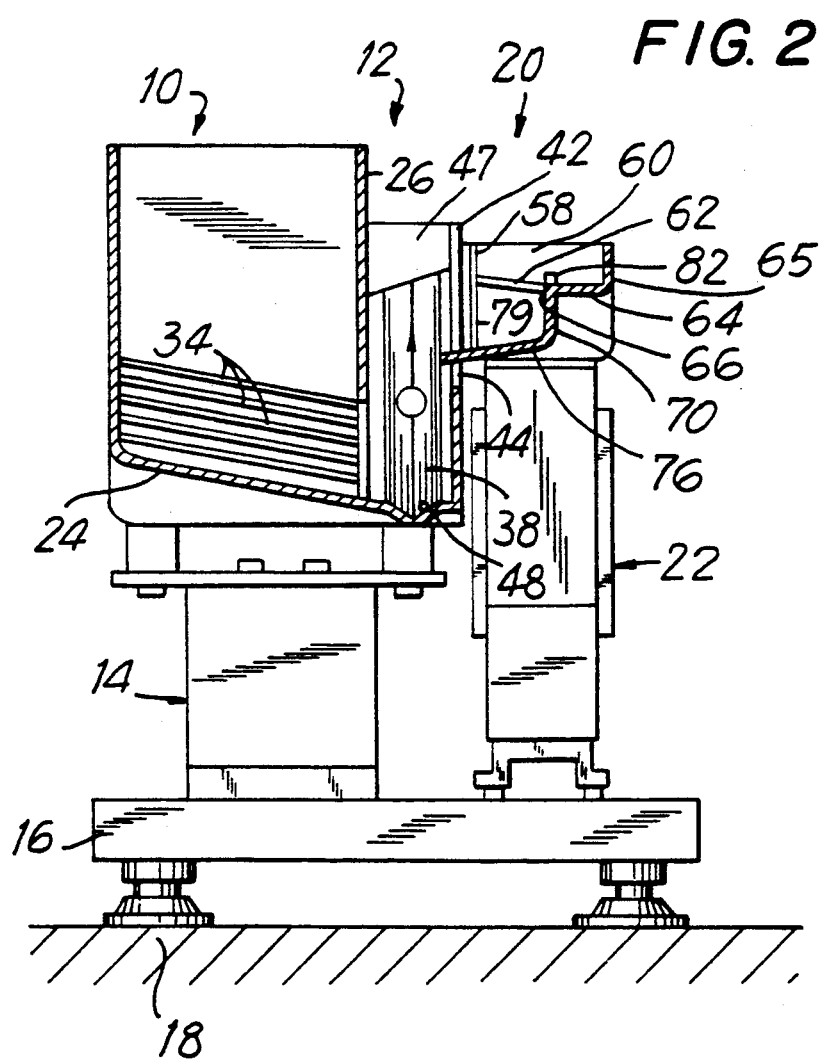
FIG. 2 is a cross section view of the device of FIG. 1 according to line II—II in FIG. 1.

The device according to FIGS. 1 to 3 has a storage container 10 which forms a structural unit with a linear slope conveyor 12. The two units 10, 12 have a common oscillating drive 14 (FIG. 2) which is arranged on a base plate 16 and is supported on a foundation 18 via the latter. A linear orientation conveyor 20 which comprises an oscillating drive 22 (FIG. 2) is arranged parallel and next to the slope conveyor 12, the oscillating drive 22 likewise being fastened on the base plate 16.

The storage container 10 has a base 24 and an intermediate wall 26 separating the container area from the conveyor area. The intermediate wall 26 is provided with an opening 30 in the container corner 28. The opening 30 leads into an input area 32 of the slope conveyor 12. The base 24 is inclined downward toward the intermediate wall 26 and toward one transverse wall 33 of the storage container 10, so that it has its lowest area in the container corner 28. The base 24 is further provided with a quantity of steps 34 arranged transversely relative to the oscillating direction. The steps 34 extend along the entire width of the base 24 in each instance.

A pile of small parts, which are located in the storage container 10 and are conveyed toward the opening 30 when the oscillating drive 14 is running, is indicated by 36.

The slope conveyor 12 has a conveying track 38 which leads from the input area 32 so as to ascend to a higher output area 40. The slope conveyor 12 is defined at the side facing away from the storage container 10 by a side wall 42 which is provided in the input area 32 with an edge notch 44 opening upward and, in the output area 40, with an opening 46 reaching up to the conveying track 38. The output area 40 is defined by a wall 47 which is inclined toward the conveying direction and deflects small parts arriving in the output area into the opening 46.

The ascending conveying track 38 is constructed in such a way that the highest possible friction occurs between it and the small parts to be conveyed. For this purpose, the conveying track 38 is coated with a friction coating, not shown in the drawing, and is provided, moreover, with a cross-sectional profile adapted to the shape of the small parts. In the present case, it is assumed e.g. that the stored small parts have a cylindrical outer shape. The conveying track 38 is provided with a V-shaped base portion 48 in order to increase the friction forces, which V-shaped base portion 48 is adapted to the outer diameter of the sliding parts and extends along the entire length of the slope conveyor 12.

The orientation conveyor 20 has a side wall 58 facing the slope conveyor 12 and comprising an opening 59 located opposite the opening 46 of the slope conveyor 12, which opening 59 leads into an input area 60. The latter comprises a base 62 (FIG. 2) which sinks diagonally down until the height of an orientation track 64. The latter comprises a running surface whose width is defined by a rear wall 65 and a longitudinal edge 66 which extends approximately to the center of the width of the orientation conveyor 20. A return track 68, which is defined in width by the side wall 58 and an intermediate wall 70 which rises up to the longitudinal edge 66, is arranged parallel and adjacent to the orientation track 64. The return track 68 is lower than the orientation track 64.

The intermediate wall 70 comprises a wall portion 72 which faces the input area 60 and steadily reduces the input area 60 in width toward a transition area 74 to the orientation track 64. The return track 68 comprises a base 76 which drops slightly toward the side wall 58 which is provided at the output of the return track 68 with an opening 77 reaching to the base 76. This opening 77 lies opposite the edge notch 44 in the side wall 42 of the slope conveyor 12 after the parts are assembled, wherein a tongue-like projection 78 of the base 76 projects into the input area 32 of the slope conveyor 12. The height of the side wall 58 is lowered between points d and e to an overflow edge 79 (FIG. 1) which prevents a build-up of small parts in the return track 68.

The orientation track 64 passes without interruption into an output track 80 which is constructed as a buffer track and can possibly be an exchangeable added part. The orientation track 64 itself is provided with baffles 82, only schematically indicated in the drawing, which deflect non-orientated small parts into the return track 68 via the longitudinal edge 66. The running surface and the baffles of the orientation track 64 are adapted to the small parts to be conveyed. These elements can advisably be constructed as exchangeable parts.

The described device operates in the following way: The oscillating drive 14 conveys the pile of small parts contained in the storage container 10 toward the container corner 28, from which point the small parts arrive through the opening 30 into the input area 32 of the slope conveyor 12. The steps 34 at the base 24 of the storage container 10 ensure that the stored small parts do not wander upwards and fall over the intermediate wall 26 into the output area of the slope conveyor 12 where they can cause a build-up.

The small parts on the conveying track 38 proceed upward from the input area 32 of the slope conveyor 12 in the direction of the arrows in the drawing into the output area 40 and then into the input area 60 of the orientation conveyor 20. In addition to the surface character and geometric design of the conveying track 38, the oscillating drive 14 and the angle of inclination are also adapted to the small parts in such a way that the small parts lying directly on the conveying track 38 are reliably conveyed in a wide range of the conveyor capacities and small parts lying on top of one another slide away from one another when the possibility of deflection is present and at least when the drive is running. Thus, proceeding with a predetermined degree of charging or conveying capacity, a circulation occurs in a plane perpendicular to the conveying track 38, which circulation does not impede the conveying and which, without impairing the operating reliability, permits the assignment of a certain storage or buffer function for a partial quantity of the small parts to the slope-conveyor 12.

The small parts arrive from the input area 60 of the orientation conveyor 20 into the orientation track 64, in which non-orientated small parts are deflected at the baffles 82 laterally into the return track 68 on which they arrive back in the input area 32 of the slope conveyor 12. The orientated small parts are conveyed into the output track 80 and are retrieved, as required, from the latter by the work station. When there is a build-up in the orientation track 64, small parts fall out of the input area 60 or the transition area 74 over the base edge at the wall portion 72 into the return track 68, where they are deliberately guided back into the input area 32 of the slope conveyor 12.

In the exceptional case that a build-up is also formed in the return track 68, the small parts are guided back via the overflow edge 79 to the conveying track 38 of the slope conveyor 12. A circulation of the small parts in the slope conveyor 12 is reinforced by means of the return of the small parts into the input area 32 of the slope conveyor 12, which is effected in a directed manner in the normal case; the circulation prevents the formation of a pile in its output area 40 and thus ensures an unimpaired functioning of the device.

Figure 4:
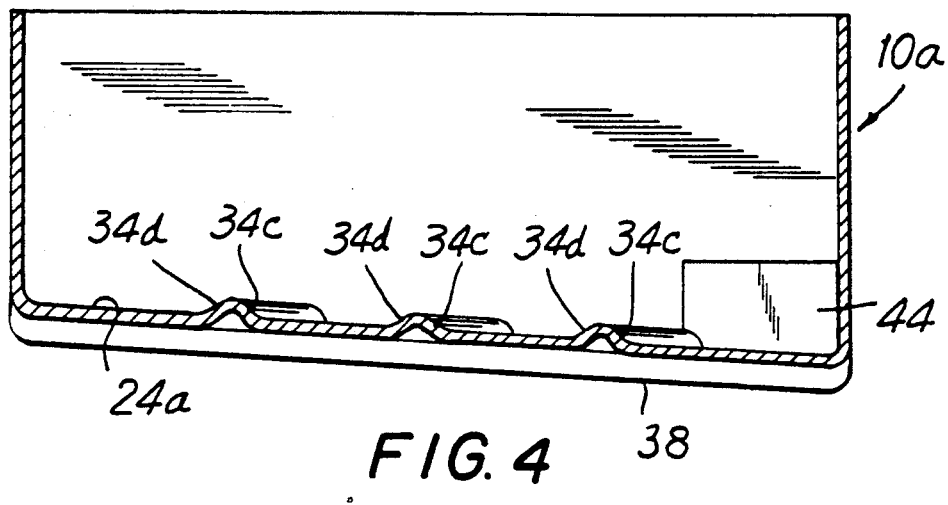
FIG. 4 shows a longitudinal section, corresponding to FIG. 3, through the storage container according to the second embodiment example.
Figure 5:
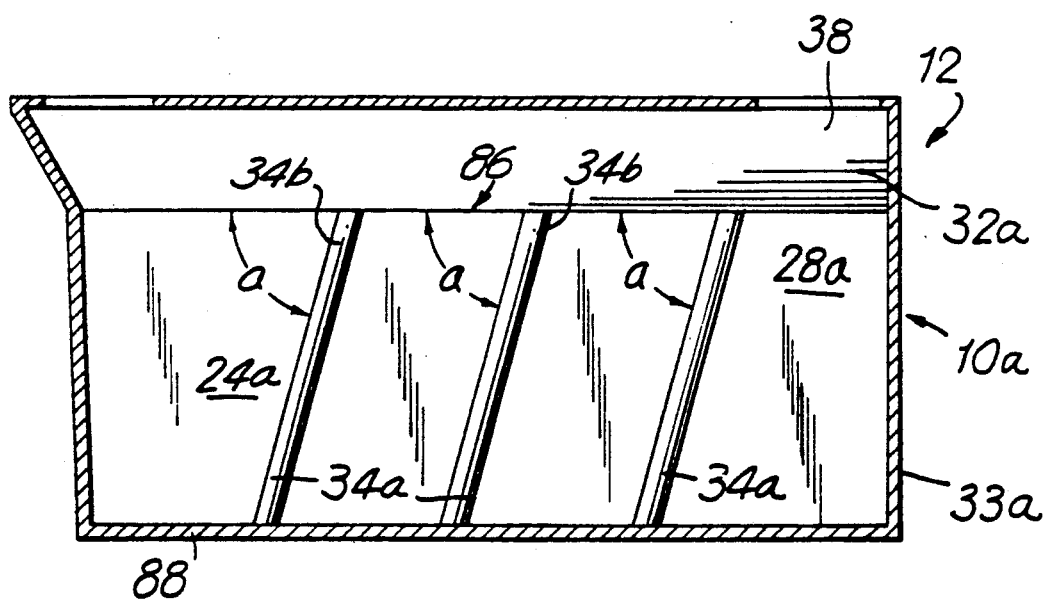
FIG. 5 shows a top view of the storage container according to FIG. 4.

In the second embodiment example according to FIGS. 4 and 5, a storage container 10a is provided next to the slope conveyor 12, which storage container 10a forms a structural unit together with the slope conveyor 12 and is driven together with the latter so as to oscillate. The storage container 10a has a base 24a which preferably extends only so as to be inclined in the oscillating direction and is also advisably inclined toward the slope conveyor 12 only in the area of the container corner 28a. The base 24a extends to the conveying track 38 of the slope conveyor 12 at an edge 86, the conveying track 38 being somewhat lower, but ascending in the same direction and at the same angle. An intermediate wall between the storage container 10a and the slope conveyor 12 is not provided in this embodiment example. The slope of the base 24a toward the container corner 28a or the transverse wall 33a adjacent to the latter, respectively, can be 5° to 30° depending on the stored material.

The storage container 10a is further distinguished from that according to the first embodiment example by a different construction of the shoulders at the base 24a which obstruct and prevent an upward movement of the stored small parts. The base 24a is provided with doorsill-like raised portions 34a instead of steps 34, which raised portions 34a are stamped into the base 24a which comprises sheet metal. The raised portions 34a are aligned at an angle a relative to the edge 86 and relative to the oscillating direction, respectively, in such a way that their lower end portions 34b are adjacent to the conveying track 38. Strips could also be placed on the container base instead of the doorsill-like raised portions 34a, the height of the strips can be adapted to the desired function regardless of the manufacturing conditions. In many cases, it could also be advantageous if the doorsill-like raised portions are constructed at the base 24a as sharp-edged crossbeams which are molded at the base in one piece or are fastened to the base 24a as added parts.

During operation of the device according to FIGS. 4 and 5, the raised portions 34a exert a force component on the small parts impacting on their flank 34c facing the container wall 33a or resting against this flank, which force component is directed away from the conveying track 38. The piles of small parts located on the individual areas of the container base 24a lying between the raised portions 34a are forced from the conveying track 38 and toward the side wall 88 of the storage container 10a, so that no build-up can occur on the conveying track 38. The small parts lying on top of the piles slide into the output area of the storage container 10a and fall over the edge 86 into the input area 32a of the conveying track 38. As soon as the small parts carry out relative movements relative to the container base 24a when the storage container 10a is emptying itself, they are deflected toward the edge 86 when impacting on the upper flanks 34d of the raised portions 34a and can fall into the gaps of the conveying track 38 not occupied by small parts.

By "shoulders of the base" in the following claims we mean the raised portions 34a or the steps 34 of the base.

It will be understood that each of the elements described above, or two or more together, may also find a useful application in other types of structures differing from the types described above.

While the invention has been illustrated and described as embodied in device for storing and delivering of small parts or articles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

1. In a device for storing and delivering of small parts, comprising a box-shaped storage container having a base adapted to hold an irregular pile of said small parts, said storage container being provided with an oscillating drive producing an oscillation of the storage container in an oscillation direction and said base being inclined in the direction of oscillation so that said base has a lowest point, and further comprising a conveying track and a conveyor, said conveying track being arranged next to the base of the storage container and ascending from the lowest point of the base in the oscillation direction, said conveying track being likewise driven so as to oscillate and reaching into a higher input area of said conveyor, the improvement wherein at least a partial area of the base (24, 24a) of the storage container (10, 10a) is provided with a plurality of shoulders for obstructing and preventing an upward movement of the small parts stored in the storage container, which shoulders are directed transversely relative to the oscillating direction toward the lowest point of the base.

2. The improvement as defined in claim 1, wherein the shoulders on the base (24a) of the storage container (10a) comprise doorsill-like raised portions (34a) of the base.

3. The improvement as defined in claim 2, wherein the shoulders on the base (24a) of the storage container (10a) have lower end portions (34b) and are arranged at an angle (a) relative to the oscillating direction in such a way that said lower end portions (34b) are adjacent to the conveying track (38).

4. The improvement as defined in claim 1, wherein the conveyor is a linear orientation conveyor.

5. In a device for storing and delivering of small parts, comprising a box-shaped storage container having a base adapted to hold an irregular pile of said small parts, said storage container being provided with an oscillating drive producing an oscillation of the storage container in an oscillation direction and said base being inclined in the direction of oscillation so that said base has a lowest point, and further comprising a conveying track and a conveyor, said conveying track being arranged next to the base of the storage container and ascending from the lowest point of the base in the oscillation direction said conveying track being likewise driven so as to oscillate and reaching into a higher input area of said conveyor, the improvement wherein at least a partial area of the base (24, 24a) of the storage container (10, 10a) is provided with a plurality of shoulders for obstructing and preventing an upward movement of the small parts stored in the storage container, which shoulders are directed transversely relative to the oscillating direction toward the lowest point of the base, the conveying track (38) is mounted on the storage container (10), and the oscillating drive drives both the storage container (10, 10a) and conveying track (38).

* * * * *